United States Patent [19]

Jakob et al.

[11] Patent Number: 5,545,684
[45] Date of Patent: Aug. 13, 1996

[54] EMULSION ADHESIVES

[75] Inventors: Martin Jakob, Kelkheim; Volker Matz, Frankfurt, both of Germany

[73] Assignee: Hoechst Aktiengesellschaft, Frankfurt am Main, Germany

[21] Appl. No.: 487,513

[22] Filed: Jun. 7, 1995

[30]     Foreign Application Priority Data

Jun. 11, 1994 [DE] Germany ............... 44 20 484.1

[51] Int. Cl.$^6$ .............. C08K 5/07; C08L 29/04; C08G 63/91; C08F 8/42
[52] U.S. Cl. .............. 524/354; 524/355; 524/503; 525/57; 525/61
[58] Field of Search .............. 524/354, 355, 524/503; 525/57, 61

[56]     References Cited

U.S. PATENT DOCUMENTS

| | | | |
|---|---|---|---|
| 3,301,809 | 1/1967 | Goldberg et al. | 524/809 |
| 3,563,851 | 2/1971 | Armour et al. | 524/503 |
| 3,700,611 | 10/1972 | Nickerson et al. | 524/354 |
| 3,931,088 | 1/1976 | Sakurada et al. | 524/501 |
| 3,932,335 | 1/1976 | Gorton | 524/364 |
| 4,118,357 | 10/1978 | Brabetz et al. | 524/503 |
| 4,396,739 | 8/1983 | Sirota et al. | 524/394 |
| 4,663,377 | 5/1987 | Hombach et al. | 524/196 |
| 4,695,606 | 9/1987 | Floyd et al. | 525/160 |
| 5,296,532 | 3/1994 | Haerzschel et al. | 524/398 |
| B1 3,931,088 | 3/1983 | Sakurada et al. | 524/197 |

FOREIGN PATENT DOCUMENTS

| | | |
|---|---|---|
| 1031887 | 5/1978 | Canada . |
| 0191460 | 8/1986 | European Pat. Off. . |
| 0413136 | 2/1991 | European Pat. Off. . |
| 2261402 | 4/1976 | Germany . |

*Primary Examiner*—Peter A. Szekely
*Attorney, Agent, or Firm*—Foley & Lardner

[57]     ABSTRACT

Aqueous emulsion adhesives having a pH from 2 to 6 which comprise homo- or copolymeric polyvinyl esters, polymeric protective colloids, water-soluble compounds which can be complexed with the polymeric protective colloids, and at least partially masked polyaldehydes having at least 3 carbon atoms from which aldehyde groups can be released in a controlled manner in acidic media are suitable for bonding porous and semiporous substrates.

17 Claims, No Drawings

EMULSION ADHESIVES

BACKGROUND OF THE INVENTION

1. Field of the Invention

The present invention relates to aqueous, polyvinyl ester-based emulsion adhesives having a practical pot life, to films of these which have increased water resistance, to the preparation of these emulsion adhesives, to their use for bonding porous and semiporous substrates, and to substrates so bonded.

2. Description of Related Art

Aqueous emulsions of polyvinyl esters, in particular of polyvinyl acetate, are used for gluing wood and other porous substrates. The chemistry of these adhesives, which are produced in large industrial volumes, has long been the subject-matter of patent publications and has been described in technical publications, for example, in Wood Adhesives—Chemistry and Technology, Volume 1, chapter 7, Marcel Dekker, New York, 1983.

A subgroup of polyvinyl ester emulsions comprises those having increased water resistance of their films. The sensitivity of polyvinyl ester-based adhesive bonds to water is due predominantly to the presence of hydrophilic stabilizers, in particular, of polyvinyl alcohol, which are usually used in the production of the adhesive emulsion. One way of achieving an improvement in the water resistance is therefore, for example, to reduce the hydrophilicity of the adhesive by crosslinking the polyvinyl alcohol by means of reactive compounds.

Thus, DE-B 22 61 402 states that a polyvinyl ester emulsion to which a crosslinking-inducing resin, for example, a urea-formaldehyde resin, is admixed gives water-resistant adhesive bonds in combination with a free organic or inorganic acid or an acidic metal salt.

Another method of reducing the hydrophilicity of the adhesive, which has been known for some time, is to copolymerize vinyl esters in the presence of monomers which can be crosslinked with polyvinyl alcohol, such as N-methylol(meth)acrylamide. A method of this type is described, for example, in U.S. Pat. No. 3,301,809. Combination with acidic curing agents, for example, organic acids or acidic ammonium salts, gives water-resistant adhesives.

As curing agents for crosslinkable, polyvinyl alcohol-stabilized polyvinyl acetate adhesive emulsions, U.S. Pat. No. 3,563,851 proposes, in particular, the acidic salts of Al(III) and of Cr(III).

The specifications of DE-C 26 20 738 and DE-A 39 42 628 likewise relate to adhesive systems based on copolymers of vinyl esters with crosslinkable comonomers including N-methylolacrylamide, which crosslink with acidic catalysis. These adhesives likewise require the use of strong water-soluble acids or metal salts thereof, in particular salts of Cr(III), Al(III), Fe(III) and Zr(IV). According to DE-A 39 42 628, the achievement of adhesive bonds which are resistant to hot water, in accordance with the BS EN 204 test standard, strength group D4 (formerly DIN 68602 B4), additionally requires the copolymerization of highly branched vinyl carboxylates if acidic aluminum salts are used as curing agents.

In contrast to these adhesive systems, the crosslinking of which is catalyzed exclusively by acidic curing agents, it also is known subsequently to add to the emulsions various additives which increase the water resistance of adhesive bonds produced using these emulsions. The effect of these additives is due to crosslinking reactions involving the polyvinyl alcohol.

One group of these additives includes hydrophobic, aliphatic, or aromatic polyisocyanates. U.S. Pat. No. 3,931,088 mentions the addition of polyfunctional isocyanate compounds, for example, toluidene diisocyanate, to aqueous adhesive emulsions containing polyvinyl alcohol. These compounds are added in solvents.

As a further development, EP-A 0 206 059 describes a water-dispersible polyisocyanate preparation in which some of the isocyanate groups are masked by emulsifiers. The addition of this product to polyvinyl acetate emulsions gives adhesive bonds which are resistant to hot water and are classified in BS EN 204 strength group D4.

A further group of additives which improve the water resistance of emulsion adhesives comprises polyfunctional aldehydes.

In U.S. Pat. No. 3,932,335, polyvinyl ester emulsions which give water-resistant adhesive bonds are obtained by adding glyoxal in combination with water-soluble polyols.

EP-A 0 191 460 describes polyvinyl alcohol-stabilized polyvinyl acetate emulsions which are crosslinked with glutaraldehyde and give films which are resistant to boiling water for at least 30 minutes.

The above-mentioned curing agent systems have some disadvantages for the user. The use of acidic curing agents results in a drop in viscosity of the emulsions, in particular, when relatively large amounts are used. In addition, relatively large amounts of these additives, particularly in the case of chromium and aluminum salts, cause an undesired increase in the powder point of the emulsions and a drop in the short-term bonding strength. Any acidic salt solution admixed separately can cause corrosion in the application equipment. In addition, the aqueous solutions of the salts represent hazardous materials during application due to their irritant action. The blue-green adhesive joint formed on use of chromium(III) salts, which are furthermore toxic, adversely affects the visual impression of glued articles, in particular in the case of pale wood types.

The use of urea-formaldehyde resins as described in DE-B 22 61 402 results in gradual liberation of formaldehyde from the adhesive. Use of the crosslinking polyisocyanates as described in EP-A 0 206 059 results in gradual, undesired foaming of the preparations during application which is caused by released carbon dioxide, as described herein in comparative examples V1, V2 and V3, Table 1.

Some of the emulsion adhesives prepared as described in EP-A 0 191 460 with addition of polyaldehydes satisfy the existing demands. But the systems that have adhesive bonds with high water resistance cannot simultaneously achieve the requisite practical pot lives of at least 8 hours. In addition, systems of this type produce a strong odor nuisance due to the high content of free polyaldehyde, as shown in comparative example V4, Table 1.

SUMMARY OF THE INVENTION

Accordingly, it is an object of the present invention to provide a polyvinyl ester emulsion for adhesives which has improved adhesive properties, has a practical pot life and enables the production of adhesive bonds having increased water resistance over comparable systems without having the disadvantages of known adhesives.

It is also an object of the invention to provide processes for making such emulsions and methods of using such emulsions.

It has now been found that these and other objects are achieved by an aqueous polyvinyl ester emulsion which, in addition to polymeric protective colloids, contains water-soluble compounds which can be complexed with the protective colloids and contains derivatives of polyaldehydes from which aldehyde groups can be liberated under acidic conditions.

There has been provided in accordance with the present invention, an aqueous emulsion adhesive having a pH of from 2 to 6, comprising homo- or copolymeric polyvinyl ester(s), polymeric protective colloid(s), water-soluble compound(s) which can be complexed with the polymeric protective colloid(s), and at least partially masked polyaldehyde(s) preferably having at least three carbon atoms from which aldehyde groups can be liberated in a controlled manner in acidic media.

There has also been provided in accordance with the present invention various processes for the preparation and use of these emulsions.

Further objects, features, and advantages of the present invention will become apparent from the detailed description of preferred embodiments that follows.

DETAILED DESCRIPTION OF THE PREFERRED EMBODIMENTS

Suitable emulsion polymers employed as the polymer base in the emulsion adhesives according to the present invention, include one or more of any desired homo- or copolymeric polyvinyl esters or mixtures of these. Suitable monomers for these homo- or copolymeric polyvinyl esters include vinyl formate, vinyl acetate, vinyl propionate, vinyl isobutyrate, vinyl pivalate, vinyl 2-ethylhexanoate, vinyl esters of saturated, branched monocarboxylic acids having 9 to 10 carbon atoms in the acid radical, vinyl esters of relatively long-chain, saturated or unsaturated fatty acids, such as, for example, vinyl laurate, vinyl stearate and vinyl esters of benzoic acid and substituted derivatives of benzoic acid, such as vinyl p-tert-butylbenzoate. Of these, vinyl acetate is particularly preferred. The vinyl esters can also be present in combination in the polyvinyl ester. The proportion of these vinyl esters in the polymer is generally at least 50% by weight, preferably at least 75% by weight.

Any other desired monomer or monomers can be copolymerized with the vinyl ester units. For example, other ethylenically unsaturated monomers which can be copolymerized with vinyl esters include α,β-unsaturated acids, for example, acrylic acid, methacrylic acid, and esters thereof with primary and secondary, saturated, monohydric alcohols having 1 to 18 carbon atoms, for example, methanol, ethanol, propanol, butanol, 2-ethylhexyl alcohol, cycloaliphatic alcohols and relatively long-chain fatty alcohols. It is also possible to use α,β-unsaturated dicarboxylic acids, for example, maleic acid, fumaric acid, itaconic acid or citraconic acid, and mono- or diesters thereof with saturated, monohydric, aliphatic alcohols having 1 to 18 carbon atoms. The proportion of these comonomers relative to the total amount of monomers is up to 25% by weight, preferably 0.1 to 15% by weight.

Other suitable comonomers for forming the polyvinyl esters include ethylenically unsaturated hydrocarbons, such as ethylene or α-olefins having 3–18 carbon atoms, for example, propylene, butylene, furthermore styrene, vinyltoluene, vinylxylene and halogenated, unsaturated, aliphatic hydrocarbons, for example, vinyl chloride, vinyl fluoride, vinylidene chloride and vinylidene fluoride. The proportion of these comonomers relative to the total amount of monomers is up to 50% by weight, preferably 1 to 25% by weight.

The polyvinyl ester polymer can also contain polyethylenically unsaturated monomers, for example, diallyl phthalate, diallyl maleate, triallyl cyanurate, tetraallyloxyethane, divinylbenzene, butanediol 1,4-dimethacrylate, triethylene glycol dimethacrylate, divinyl adipate, allyl(meth)acrylate, vinyl crotonate, methylenebisacrylamide, hexanediol diacrylate, pentaerythritol diacrylate and trimethylolpropane triacrylate. The proportion of these comonomers relative to the total amount of monomers is up to 10% by weight, preferably 0.01 to 2% by weight.

Particularly suitable comonomers are those containing N-functional groups, including, in particular, (meth)arylamide, allyl carbamate, acrylonitrile, N-methylol(meth)acrylamide, N-methylolallyl carbamate and the N-methylol esters, alkyl ethers and Mannich bases of N-methylol(meth)acrylamide and N-methylolallyl carbamate, acrylamidoglycolicacid, methyl acrylamidomethoxyacetate, N-(2,2-dimethoxy-1-hydroxyethyl)acrylamide, N-dimethylaminopropyl(meth)acrylamide, N-methyl(meth)acrylamide, N-butyl(meth)acrylamide, N-cyclohexyl(meth)acrylamide, N-dodecyl(meth)acrylamide N-benzyl(meth)acrylamide, p-hydroxyphenyl(meth)acrylamide, N-(3-hydroxy-2,2-dimethylpropyl)methacrylamide, ethylimidazolidone methacrylate, N-vinylformamide, N-vinylpyrrolidone. The proportion of these comonomers relative to the total amount of monomers is up to 15% by weight, preferably 0.1 to 10% by weight.

Other particularly suitable comonomers for the polyvinyl esters which, owing to their functional groups, can improve the adhesive properties and the water resistance of the emulsion in combination with derivatives of polyaldehydes are hydroxy-functional monomers, such as hydroxyethyl (meth)acrylate, hydroxypropyl (meth)acrylate and adducts thereof with ethylene oxide or propylene oxide. The proportion of these comonomers relative to the total amount of monomers is up to 25% by weight, preferably 0.1 to 15% by weight.

Also particularly suitable are comonomers which are crosslinkable or self-crosslinking via carbonyl groups, such as diacetoneacrylamide, allyl acetoacetate, vinyl acetoacetate and acetoacetoxyethyl (meth)acrylate. The proportion of these comonomers relative to the total amount of monomers is up to 10% by weight, preferably 0.01 to 5% by weight.

The proportion of comonomer units present in the polymer in addition to the vinyl ester units generally totals up to 50% by weight.

In addition to the homo- or copolymeric polyvinyl ester, the novel adhesive emulsions contain polymeric protective colloids. Any such colloids can be used. An example of a suitable compound is polyvinyl alcohol, in particular polyvinyl alcohol having a degree of hydrolysis of 60–100 mol %, preferably from 70 to 98 mol %, and a preferred viscosity of from 2 to 70 mPa.s for a 4% strength by weight aqueous solution at 20° C. It is also useful to use products produced by the reaction of polyvinyl alcohol with diketene or copolymeric, carboxyl-carrying types of polyvinyl alcohols. The protective colloids can furthermore be etherified cellulose derivatives, for example, hydroxyethylcellulose or carboxymethylcellulose. These can be used either alone or in combination with polyvinyl alcohol. Also suitable are polyvinylpyrrolidone, polycarboxylic acids, such as polyacrylic acid, and copolymers of maleic acid or of maleic anhydride with ethylenically unsaturated compounds, such as methyl vinyl ether or styrene.

Based on the solids content of the adhesive, the proportion of polymeric protective colloids is preferably from 1 to 20% by weight, in particular from 2 to 10% by weight.

In addition to the polymeric protective colloids, up to 2% by weight, based on the polymer of the colloid, of nonionic and/or ionic emulsifiers can also be used in the polymerization liquor.

The term at least partially masked polyaldehydes having at least three carbons, i.e., compounds containing at least two aldehyde groups from which aldehyde groups are liberated in aqueous acidic media, is taken to mean compounds which preferably undergo controlled hydrolysis at a pH of from 2 to 6, in particular from 2.5 to 4, liberating an adjustable amount of aldehyde groups per time unit. In these derivatives of polyaldehydes, at least some of the aldehyde groups, preferably all of the aldehyde groups, are initially blocked.

Any such polyaldehydes can be used. Particularly preferred derivatives of polyaldehydes are their bisulfite adducts. The counter ions in these bisulfite adducts are preferably lithium, sodium, potassium, magnesium, calcium, aluminum, ammonium, or substituted ammonium ions.

Examples of suitable bisulfite adducts are those of malonic dialdehyde, propanonedial (mesoxalic dialdehyde), succinic dialdehyde, butanonedial, glutaric dialdehyde, adipaldehyde, β-methylglutaric dialdehyde, pimelic dialdehyde, suberic dialdehyde, maleic dialdehyde, fumaric dialdehyde, sebacic dialdehyde, maleic dialdehyde, phthalic dialdehyde, isophthalic dialdehyde, terephthalic dialdehyde, and ring-substituted derivatives of these compounds.

Particularly suitable are bisulfite adducts of aliphatic dialdehydes having at least 3 carbon atoms. Of these, glutaric dialdehyde/bisalkali metal bisulfites are particularly preferred.

Other derivatives of at least bifunctional aldehydes which are suitable according to the invention are open-chain acetals thereof with aliphatic ($C_1$–$C_{20}$)-, preferably ($C_1$–$C_{12}$)-monoalcohols, in particular methanol and ethanol, and cyclic acetals thereof with at least bifunctional alcohols, preferably ethylene glycol, 1,2-propylene glycol and 1,3-propylene glycol.

Specific mention may be made by way of example to chloromalonic dialdehyde bisdiethyl acetal, succinic dialdehyde mono- and bisdimethyl acetal, succinic dialdehyde bisdiethyl acetal, 2-bromosuccinic dialdehyde bisdimethyl acetal, oximinosuccinic dialdehyde bisdimethyl acetal and the bisdimethyl and bisdiethyl acetals of maleic dialdehyde.

This group furthermore includes the intramolecular cyclic acetals of succinic dialdehyde, maleic dialdehyde and glutaric dialdehyde and more highly ring-substituted derivatives thereof such as 2,5-dimethoxytetrahydrofuran, 2,5-diethoxytetrahydrofuran, 2,5-dihydro-2,5-dimethoxyfuran, 2,5-dihydro-2,5-diethoxyfuran, 3-formyl-2,5-dimethoxytetrahydrofuran, 2,6-dimethoxytetrahydro-2H-pyran and 2,6-diethoxytetrahydro-2H-pyran. Particularly suitable compounds in this group are the open-chain bisdimethyl and bisdiethyl acetals of malonic dialdehyde and glutaric dialdehyde and the cyclic acetals of succinic dialdehyde.

Other suitable derivatives of polyaldehydes are the enol ethers, enol esters, acylates and mixed acylate ethers of polyfunctional aldehydes. These also include compounds containing aldehyde groups which, for constitutional reasons, are predominantly in the enol form, for example, oxypyruvic aldehyde (reduction). These, and products of the reaction of enols, in which the remaining aldehyde groups not in the enol form can furthermore be masked, are likewise suitable derivatives.

Other polyaldehyde derivatives which are suitable according to the invention are the cleavable products of the reaction of the polyaldehydes with nitrogen compounds. These derivatives include the oximes, oxime esters, oxime ethers, imines (Schiff bases), enamines, aminals, hydrazones, semicarbazones, α,β-diurethanes and enamine urethanes of polyfunctional aldehydes.

Specific mention may be made by way of example of glutaric dialdehyde dioxime, phthalic dialdehyde mono- and dioxime, phthalic dialdehyde oxime semicarbazone, isophthalic aldoxime, terephthalic aldoxime, terephthalic aldehyde dihydrazone, and the anils of malonic dialdehyde, succinic dialdehyde and glutaric dialdehyde.

Naturally, mixed forms between the masking possibilities mentioned here are also permissible for the purposes of the invention.

The amount of the polyaldehyde derivatives used is generally from 0.001 to 10% by weight, based on the solids content of the adhesive emulsion, and depends on the nature of the derivatives employed and on the composition of the emulsion. The preferred range is from 0.01 to 5% by weight, in particular from 0.1 to 2% by weight, based on the solids content of the adhesive emulsion.

The compounds which can be complexed with the polymeric protective colloids include any such compounds and are preferably salts, in particular acidic salts with polyvalent complexible cations, as mentioned, for example, in DE-B 22 61 402, DE-C 26 20 738 and DE-A 39 42 628, each of which is hereby incorporated by reference in its entirety. Preference is given to the water-soluble metal salts of Al(III) or Zr(IV), in particular aluminum chloride, aluminum nitrate and zirconium oxychloride. Other compounds which are suitable for complexing with the polymeric protective colloids are acids and salts with oxo anions, preferably oxo anions which are capable of binding polyanions, for example, borates and phosphates. Free boric acid and phosphoric acid are particularly suitable.

The proportion of the compounds which can be complexed with the polymeric protective colloids present in the adhesive emulsion preferably is from 0.1 to 20% by weight, in particular from 0.5 to 10% by weight.

The adhesive emulsion may contain further conventional additives in amounts effective to achieve the desired purpose, for example, film-formation aids for reducing the MFT (=minumum film forming temperature), plasticizers, antifoams, fillers and preservatives.

The solids content of the novel adhesive emulsion is generally from 20 to 65% by weight, in particular from 30 to 60% by weight.

The adhesive emulsion has an acidic pH in a range in which the polyaldehyde derivatives are slowly hydrolyzed and the aldehyde groups are liberated in a controlled manner. This pH range is preferably from 2 to 6, in particular from 2.5 to 4. A suitable pH can already be achieved after emulsion polymerization of the homo- or copolymeric vinyl esters or can be established subsequently by addition of acidic compounds.

In order to establish the pH in the desired acidic range, organic and/or inorganic Lewis and Brønsted acids are, for example, suitable. Preferred Brønsted acids have a $pK_a$ value of less than 2.5, for example, hydrochloric acid, sulfuric acid, nitric acid, perchloric acid, p-toluenesulfonic acid, in particular phosphoric acid. Particularly suitable Lewis acids are the acidic salts of complexible metal ions, in particular aluminum chloride, aluminum nitrate and zirconium oxychloride.

The present invention also relates to processes for the preparation of the novel emulsion adhesive. To this end, a homo- or copolymeric polyvinyl ester emulsion containing the polymeric protective colloids and, if desired, emulsifiers is preferably first prepared.

The polyvinyl ester emulsion is prepared by the conventional continuous or batch procedure of free-radical emulsion polymerization, using water-soluble and/or oil-soluble initiator systems, such as peroxodi-sulfates, azo compounds, hydrogen peroxide, organic hydroperoxides or dibenzoyl peroxide. These can be used either alone or in combination with reducing compounds, such as Fe(II) salts, sodium pyrosulfite, sodium bisulfite, sodium sulfite, sodium dithionite, sodium formaldehyde sulfoxylate, or ascorbic acid as redox catalyst system.

The polymeric protective colloids and emulsifiers can be added before, during or after the polymerization. The compounds which can be complexed with the polymeric protective colloids and the polyaldehyde derivatives are then added to this emulsion and, if necessary, the pH is adjusted to the requisite range by addition of Lewis or Brønsted acid.

It is particularly preferred that the polyvinyl ester emulsion containing the polymeric protective colloids is first preformulated with the complexible compounds, preferably acidic metal salts or salts or acids of oxo anions, in particular aluminum chloride, aluminum nitrate or zirconium oxychloride, or phosphoric acid or boric acid and only finally, as a two-component system, mixed with the polyaldehyde derivatives.

These components can be added to the polyvinyl ester emulsion either by dissolving the pure compounds in the emulsion or by adding a solution in a suitable solvent, for example, aliphatic alcohols, or an aqueous solution. The addition is preferably carried out in the form of a concentrated aqueous solution in order to minimize the drop in viscosity of the adhesive emulsion. The compounds glutaric dialdehyde bissodium bisulfite and glutaric dialdehyde bispotassium bisulfite which are particularly preferred as polyaldehyde derivatives can, for example, be added in the form of an approximately 20% strength by weight aqueous solution.

An undesired drop in viscosity of the emulsion after addition of an aqueous solution of the polyaldehyde derivatives can advantageously be prevented by first mixing the aqueous solution with additives which increase the viscosity of this solution. These can be, in particular, polymeric protective colloids, preferably polyvinyl alcohol, polyvinylpyrrolidone or etherified cellulose derivatives, for example, hydroxyethyl cellulose or carboxymethyl cellulose. The solution is incorporated into the emulsion using conventional equipment, for example, paddle or anchor stirrers.

In the process according to the invention, it is also permissible to preformulate the polyvinyl ester emulsion with the polyaldehyde derivatives. To this end, a homo- or copolymeric polyvinyl ester emulsion is first prepared in the presence of polymeric protective colloids, and first at least partially masked polyaldehydes and subsequently complexible metal salts or acids are added thereto at a pH above 4.

In this case, the emulsion should as far as possible have a neutral pH, preferably above 5, in particular above 6, at which pH the polyaldehyde derivatives remain stable. For this purpose, the pH of the emulsion can also subsequently be increased to the required value by addition of conventional neutralizers. The system is then preferably activated in a two-component system by addition of suitable amounts of an acidic complexible compound, in particular an aqueous solution of aluminum chloride, aluminum nitrate, zirconium oxychloride or phosphoric acid.

A further embodiment of this process in which the polyvinyl ester emulsion is preformulated with the polyaldehyde derivatives comprises forming the polyfunctional aldehyde bisulfite adducts which are particularly preferred in accordance with the invention in situ in the adhesive emulsion. To this end, first a homo- or copolymeric polyvinyl ester emulsion is prepared in the presence of polymeric protective colloids, and polyfunctional aldehydes and compounds which supply bisulfite ions in aqueous systems, and subsequently complexible metal salts or acids are added at a pH above 5.

The emulsion has a pH range which is suitable for the formation of bisulfite adducts, established either before or after addition of the salts supplying bisulfite ions by means of conventional neutralizers, for example, dilute sodium hydroxide solution. In this case, the pH should be above 5, in particular above 6. Suitable compounds which supply bisulfite ions in aqueous systems are salts such as alkali metal bisulfites, alkali metal sulfites and alkali metal pyrosulfite. The corresponding sodium salts are particularly preferred. The polyfunctional aldehyde is then added to this emulsion either as such or in the form of a preferably aqueous solution and is distributed uniformly in the emulsion by means of conventional stirrers. The degree of masking of the polyfunctional aldehyde can be adjusted by selection of the ratio between the amounts of bisulfite and the aldehyde groups present. An at least stoichiometric ratio between bisulfite ions on the one hand and the aldehyde groups present on the other hand should preferably be established. The amount of added salt is advantageously such that a small excess of at least 0.1 equivalent of bisulfite per aldehyde group is present.

Also permissible is a variant of the above-described procedure in which first the polyfunctional aldehyde is introduced into the emulsion, the pH of which can already have been increased to a pH above 5, and converted in the aqueous phase of the emulsion into the products masked in accordance with the invention by addition of the above-described salts which supply bisulfite ions after dissociation.

In both cases, the system is activated by means of the above-described acidic, complexable compounds.

The novel adhesive emulsions have pot lives of at least 8 hours, preferably at least 16 hours, in particular at least 24 hours. Adhesive bonds made from the novel emulsion adhesives have better water resistance than comparable systems. Thus, they satisfy at least strength group D2, preferably D3, in particular D4, of the BS EN 204 test standard.

The invention furthermore relates to the use of the novel emulsion adhesive for bonding substrates, especially porous and semiporous substrates. Any such substrates can be bonded.

The novel adhesive preparations are particularly suitable as boiling-water-resistant adhesives, in particular for cellulosic substrates, such as wood. The adhesives are suitable for manual or machine application and, in particular, also applications in which the adhesive bonds are cured by highfrequency alternating currents. Further general illustrative applications are water-resistant adhesive bonds of paper, board, cardboard, foam, cement, leather, textile or laminates. Other applications are in the construction sector, as in floor, wall or ceiling adhesives, or as adhesives for furniture sheeting or carpet backings.

Other areas of suitability are in water-resistant binders for fiberboard or fibrous leather, in binders for insulation materials made from paper or plastic fibers and in water-resistant building material emulsions as binders for plaster or cement. In building material emulsions, the barrier action to solvents in concrete and mortar can be improved by the novel crosslinking agents.

Another application is the textiles sector, where the novel adhesive emulsions can be employed as binders for textiles and nonwovens as well as for textile printing and as textile finishes.

It should be emphasized that the novel emulsion adhesives are advantageously systems which are free from isocyanates and also substantially free from formaldehyde. In particular, in emulsions containing formaldehyde-releasing constituents, the particularly preferred polyaldehyde/bisulfite adducts additionally offer the further advantage that the bisulfite liberated on acid cleavage and subsequent crosslinking also functions as a formaldehyde scavenger and thus significantly reduces the concentration of free formaldehyde in the adhesives or binders.

The examples below serve to illustrate the invention without thereby limiting it. In the examples, parts and percentages are by weight, unless otherwise stated.

Base emulsion A1

A solution of 6 parts of Mowiol® 18–88 (Hoechst AG, a partly hydrolyzed polyvinyl alcohol having a degree of hydrolysis of 88 mol %) in 92 parts by weight of demineralized water is prepared in a stirred glass reactor fitted with anchor stirrer, feed means, reflux condenser, mantle heating and mantle cooling. After 0.1 part of Agitan® 280 antifoam (Münzing-Chemie) and 0.006 part of Rongalit C (sodium formaldehyde sulfoxylate) have been added, 5 of a total of 100 parts of vinyl acetate are emulsified in. The internal temperature is raised to 50° C. and the polymerization is initiated after addition of a solution of 0.03 part of Trigonox® AW 70 (tert-butyl hydroperoxide, 70% Akzo-Chemie) in 0 5 part of water After the reaction has commenced, two feeds comprising firstly 95 parts of vinyl acetate with 0.09 part of tert-butyl hydroperoxide (70%) and secondly 0.03 part of Rongalit C in 10 parts by weight of water are metered in parallel over the course of 3 hours. The mantle temperature is controlled so that the polymerization proceeds without reflux at a slowly rising internal temperature from 68° C. at the beginning to about 80° C. The polymerization is then continued with subsequent addition of aqueous solutions of 0.014 part of tert-butyl hydroperoxide (70%) and 0.004 part of Rongalit C. After cooling, 4 parts of butyldiglycol acetate are slowly stirred into the emulsion.

Solids content: 50.8%

Viscosity, Brookfield RVT, spindel 6, 20 rpm: 23,600 mPa.s.

Base emulsions A2 to A4

The preparation is carried out as described above, with the difference that only 80 parts of water are used in the polymerization liquor and, as third feed, in each case a solution of 0.5 part (in the case of A2), 1 part (in the case of A3) and 2 parts (in the case of A4) of N-methylolacrylamide in 12 parts of water are metered in. The solutions are prepared by diluting the commercially available 48% strength solution of N-methylolacrylamide. The amount of vinyl acetate metered in is in each case reduced by the amount of N-methylolacrylamide metered in, to 94.5, 94 and 93 parts, respectively.

Emulsion A2

Solids content: 50.1%

Viscosity, Brookfield RVT, 6/20: 17,800 mPa.s.

Emulsion A3

Solids content: 50.0%

Viscosity, Brookfield RVT, 6/20: 20,200 mPa.s.

Emulsion A4

Solids content: 49.9%

Viscosity, Brookfield RVT, 6/20: 29,400 mPa.s.

Examples 1 to 15 and Comparative Examples V1 to V4

The base emulsions A1 to A4 are (apart from Example 8) initially mixed with a 10% strength aqueous solution of aluminum chloride. The corresponding amounts of solid $AlCl_3$ based on the solids content of the emulsion, are shown in Table 1 with the resultant pH values of the mixtures. After a ripening time of at least one day, the curing agent is admixed. The amounts of curing agent are likewise shown in Table 1.

Determination of the tear strengths of beechwood test specimens after treatment with boiling water in accordance with BS EN 204/D4 test standard The test specimens are produced as described in BS EN 205. The gluing and testing are carried out with the following parameters:

| | |
|---|---|
| Ripening time after addition of curing agent: | 2 hours |
| Glue application rate: | 150 ± 20 g/m², application to both sides |
| Open waiting time: | 3 minutes |
| Closed waiting time: | 3 minutes |
| Pressing time: | 2 hours |
| Pressing pressure: | 0.7 ± 0.1 N/mm² |
| Number of test specimens per test sequence: | 20 |
| Testing after | 7 days, standard climatic conditions |
| Storage sequence in accordance with BS EN 204, D4/5: | 6 hours in boiling water 2 hours in cold water |
| Test temperature: | 23° C. ± 2° C. |
| Feed rate: | 50 mm/min. |

Classification in strength group D4/5 is carried out at a tear strength of ≧ 4 N/mm².

*)23 ± 2° C. and 50 ± 5% relative atmospheric humidity.

Pot life:

This is taken to mean the time for which the adhesive emulsion remains reliably flowable after addition of curing agent with a viscosity of ≦40,000 mPa.s, measured in accordance with Brookfield RVT, 6/20.

TABLE 1

| Example | Base emulsion | Comonomer | % of AlCl₃, based on the solids content of each emulsion | pH | Amount of curing agent added, in %, based on the emulsion | Tear strength, in accordance with BS EN 204, D4/5 N/mm² | Wt % | Pot life, hours |
|---|---|---|---|---|---|---|---|---|
| 1 | A1 | — | 1.7 | 2.8 | 2.50% GABNA 20% | 5.9 | 82 | >48 |
| V1 | A1 | — | 1.7 | 2.8 | 5.00% Desmodur DA | 3.2 | 0 | 24[1] |
| 2 | A2 | 0.5% NMA | 1.7 | 2.9 | 1.25% GABNA 20% | 6.6 | 77 | >24 |
| 3 | A2 | 0.5% NMA | 1.7 | 2.9 | 2.50% GABNA 20% | 6.7 | 22 | >24 |
| V2 | A2 | 0.5% NMA | 1.7 | 2.9 | 5.00% Desmodur DA | 3.6 | 0 | 24[1] |
| 4 | A3 | 1.0% NMA | 1.7 | 2.9 | 0.25% GABNA 20% | 6 | 2 | >8 |
| 5 | A3 | 1.0% NMA | 1.7 | 2.9 | 1.25% GABNA 20% | 7.4 | 60 | >8 |
| 6 | A3 | 1.0% NMA | 1.7 | 2.9 | 2.50% GABNA 20% | 7.1 | 67 | >8 |
| V3 | A3 | 1.0% NMA | 1.7 | 2.9 | 5.00% Desmodur DA | 5 | 53 | 24[1] |
| 7* | A4 | 2.0% NMA | - | 4 | 2.50% GABNA 20% | 0.8 | — | >24 |
| 8* | A4 | 2.0% NMA | 0.6 | 3 | — | 1.5 | — | >24 |
| 9* | A4 | 2.0% NMA | 1.7 | 2.8 | — | 3.2 | — | >24 |
| 10 | A4 | 2.0% NMA | 0.6 | 3 | 1.25% GABNA 20% | 3 | — | >8 |
| 11 | A4 | 2.0% NMA | 0.6 | 3 | 2.50% GABNA 20% | 2.9 | — | >8 |
| 12 | A4 | 2.0% NMA | 1.7 | 2.8 | 0.25% GABNA 20% | 4.7 | — | >8 |
| 13 | A4 | 2.0% NMA | 1.7 | 2.8 | 1.25% GABNA 20% | 6.2 | — | >8 |
| 14 | A4 | 2.0% NMA | 1.7 | 2.8 | 2.50% GABNA 20% | 6.7 | 27 | >8 |
| V4 | A4 | 2.0% NMA | 1.7 | 2.8 | 0.41% glutaric dialdehyde 40% | 6.6 | 28 | <8[2] |
| 15 | A4 | 2.0% NMA | 1.7 | 2.8 | 1% MABDEA | 5.2 | 7 | >8 |
| 16 | A4 | 2.0% NMA | 1.7 | 2.8 | 3% MABDEA | 6.0 | 23 | <8 |

Key to Table 1:
GABNA 20% = 20% strength solution of glutaric dialdehyde bissodium bisulfite in water
NMA = N-methylolacrylamide
MABDEA = Malonic dialdehyde bisdiethyl acetal
WT % = Percentage wood tear at the bonded surface
[1] Foam development > 50% by vol. after 24 hours
[2] Strong odor nuisance
*) not within the scope of the invention Comparative Examples V1, V2 and V3, which do not conform to the invention, relate to an adhesive containing the commercially available polyisocyanate crosslinking agent Desmodur® DA (Bayer AG) in accordance with the prior art. Compared with this, the corresponding examples according to the invention containing GABNA have significantly better tear strengths with significantly lower amounts used. Example 1 also has a pot life of 2 days.

Comparative Example V4 shows that, although comparably high boiling-water resistances are achieved when the same molar amount of glutaric dialdehyde is used as the amount of GABNA employed in Example 14, the pot life of the mixture is less than 8 hours and the processing properties of this system are impaired by a strong odor nuisance.

Examples 7, 8 and 9, which are not within the scope of the instant invention, clearly show that GABNA has no effect in the absence of acidic aluminum chloride and conversely the use of only aluminum chloride produces no boiling-water resistance, even in the presence of 2% of NMA in the copolymer.

Only a combination of the two components produces a significant effect with respect to the water resistance, as shown in Examples 10 to 14.

Determination of the short-term binding strengths

The setting rate is determined on single-overlapped beechwood test specimens produced and tested by gluing two beechwood panels, each with a thickness of 3 mm, a length of 85 mm and a width of 20 mm, under the following technical conditions:

| | |
|---|---|
| Ripening time after addition of curing agent: | 2 hours |
| Pressing time: | 2.5 or 5 minutes |
| Pressing pressure: | 0.7 ± 0.1 N/mm² |
| Number of test specimens | 10 |

-continued

| | |
|---|---|
| per test sequence: | |
| Bonded area: | 300 mm² |
| Test temperature: | 23° C. ± 2° C. |
| Feed rate: | 50 mm/min. |

The binding strength results after pressing times of 2.5 and 5 minutes are shown in Table 2:

TABLE 2

| Example | Base emulsion | Amount of curing agent added %, based on the emulsion | Tear strength N/mm² after 2.5 min. | 5 min. |
|---|---|---|---|---|
| 4 | A3 | 0.25% GABNA 20% | 1.1 | 2.3 |
| 5 | A3 | 1.25% GABNA 20% | 0.9 | 2.3 |
| 6 | A3 | 2.50% GABNA 20% | 1.3 | 2.8 |
| V3 | A3 | 5.00% Desmodur DA | 0.7 | 1.9 |

Examples 4–6 according to the invention show higher short-term binding strengths than Comparative Example V3 both after a pressing time of 2.5 minutes and after a pressing time of 5 minutes.

Determination of free formaldehyde

The determination of free formaldehyde in the emulsions is carried out by UV/VIS spectrometry in the ultracentrifuge serum of the diluted emulsion by a modified acetylacetone method.

The acetylacetone method is described in the literature (H. Petersen and N. Petri, Melliand Textilberichte 66, 363 (1985)). The measurement is carried out after a ripening time of 8 hours from admixture of the curing agent. The measurement results are shown in Table 3.

TABLE 3

| Example | Base emulsion | Amount of curing agent added %, based on the emulsion | Free HCHO ppm |
|---|---|---|---|
| 9 | A4 | none | 347 |
| 12 | A4 | 0.25% GABNA 20% | 227 |
| 13 | A4 | 1.25% GABNA 20% | 144 |
| 14 | A4 | 2.50% GABNA 20% | 91 |

While the invention has been described with reference to certain preferred- embodiments, numerous modifications, alterations, and changes to the preferred embodiments are possible without departing from the spirit and scope of the invention.

What is claimed is:

1. An aqueous emulsion adhesive having a pH of from about 2 to about 6, comprising at least one homo- or copolymeric polyvinyl ester, at least one polymeric protective colloid, at least one water-soluble compound which can be complexed with the polymeric protective colloid, and at least one partially masked polyaldehyde having at least 3 carbon atoms from which aldehyde groups can be liberated in a controlled manner in acidic media.

2. An emulsion adhesive as claimed in claim 1, wherein the homo- or copolymeric polyvinyl ester comprises at least 50% by weight of vinyl acetate monomer units.

3. An emulsion adhesive as claimed in claim 1, wherein the homo- or copolymeric polyvinyl ester comprises one or more monomer units of polyethylenically unsaturated monomers or monomers which are subsequently crosslinkable or self-crosslinking via one or more of hydroxyl, carboxyl, N-functional groups, or carbonyl groups.

4. An emulsion adhesive as claimed in claim 1, wherein the polymeric protective colloid comprises polyvinyl alcohol.

5. An emulsion adhesive as claimed in claim 1, wherein the compound which can be complexed with the polymeric protective colloid comprises a water-soluble metal salt containing a polyvalent cation.

6. An emulsion adhesive as claimed in claim 5, wherein the polyvalent cation in the complexible metal salt are one or both of Al(III) or Zr(IV).

7. An emulsion adhesive as claimed in claim 1, wherein the compound which can be complexed with polymeric protective colloid comprises one or more acids or salts containing oxo anions.

8. An emulsion adhesive as claimed in claim 7, wherein the polymeric protective colloid comprises one or more salts containing oxo anions which are phosphate or borate.

9. An emulsion adhesive as claimed in claim 1, wherein the at least partially masked polyaldehyde is present in an amount of from about 0.01 to about 5% by weight, based on the solids content of the emulsion adhesive.

10. An emulsion adhesive as claimed in claim 1, wherein the masked polyaldehyde comprises partially or fully masked bisaldehydes.

11. An emulsion adhesive as claimed in claim 10, wherein the masked bisaldehydes contain glutaric dialdehyde.

12. An emulsion adhesive as claimed in claim 1, wherein the masked polyaldehydes comprise their bisulfite adducts.

13. An emulsion adhesive as claimed in claim 1, wherein the pH of the aqueous adhesive emulsion is from about 2.5 to about 4.

14. An emulsion adhesive as claimed in claim 1, wherein the pot life during which the viscosity of the adhesive does not exceed about 40,000 mPa.s is at least about 8 hours.

15. A process for the preparation of an emulsion adhesive as claimed in claim 1 which comprises first preparing a homo- or copolymeric polyvinyl ester emulsion in the presence of one or more polymeric protective colloids, and subsequently adding one or more complexible metal salts or acids and then adding one or more at least partially masked polyaldehydes thereto.

16. A process for the preparation of an emulsion adhesive as claimed in claim 1, which comprises preparing a homo- or copolymeric polyvinyl ester emulsion in the presence of one or more polymeric protective colloids, and then, at a pH above about 4, firstly adding one or more of at least partially masked polyaldehydes and subsequently adding one or more complexible metal salts or acids.

17. A process for the preparation of an emulsion adhesive as claimed in claim 1, which comprises first preparing a homo- or copolymeric polyvinyl ester emulsion in the presence of polymeric protective colloids, and then adding, at a pH above about 5, one or more polyfunctional aldehydes and one or more compounds which supply bisulfite ions in aqueous systems, and subsequently adding one or more complexible metal salts or acids.

* * * * *